(12) United States Patent
Shukla

(10) Patent No.: US 9,609,499 B2
(45) Date of Patent: Mar. 28, 2017

(54) APPARATUS AND METHOD TO PRIORITIZE A RANDOM ACCESS PROCEDURE FOR EMERGENCY ACCESS

(71) Applicant: Avago Technologies General IP (Singapore) Pte. Ltd., Singapore (SG)

(72) Inventor: Hersh Vardhan Shukla, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 49 days.

(21) Appl. No.: 14/284,008

(22) Filed: May 21, 2014

(65) Prior Publication Data

US 2014/0349712 A1 Nov. 27, 2014

Related U.S. Application Data

(60) Provisional application No. 61/826,200, filed on May 22, 2013.

(51) Int. Cl.
| | |
|---|---|
| *H04W 4/22* | (2009.01) |
| *H04W 74/08* | (2009.01) |
| *H04W 52/36* | (2009.01) |
| *H04W 52/50* | (2009.01) |

(52) U.S. Cl.
CPC .......... *H04W 4/22* (2013.01); *H04W 52/362* (2013.01); *H04W 52/50* (2013.01); *H04W 74/0833* (2013.01)

(58) Field of Classification Search
CPC .......................... H04W 74/0833; H04W 74/08
See application file for complete search history.

(56) References Cited

U.S. PATENT DOCUMENTS

| | | | | |
|---|---|---|---|---|
| 9,055,535 B2* | 6/2015 | Iwai | ...................... | H04W 52/16 |
| 9,161,317 B2* | 10/2015 | Park | ...................... | H04W 24/10 |
| 9,265,069 B2* | 2/2016 | Ahn | ...................... | H04L 5/0053 |
| 2007/0115872 A1* | 5/2007 | Kim | ...................... | H04W 52/44 |
| | | | | 370/318 |
| 2010/0255847 A1* | 10/2010 | Lee | ...................... | H04W 52/50 |
| | | | | 455/436 |
| 2011/0165874 A1* | 7/2011 | Amirijoo | .......... | H04W 74/0866 |
| | | | | 455/434 |
| 2012/0063305 A1* | 3/2012 | Chiu | ................ | H04W 74/0833 |
| | | | | 370/230 |
| 2013/0070700 A1* | 3/2013 | Chang | ............... | H04W 74/0833 |
| | | | | 370/329 |

(Continued)

*Primary Examiner* — Bobbak Safaipour
(74) *Attorney, Agent, or Firm* — Sterne, Kessler, Goldstein & Fox P.L.L.C.

(57) ABSTRACT

A communication device and base station configured to perform random access procedures utilizing, for example, Long-term Evolution (LTE). For example, the random access procedures can be performed for emergency calls. The base station can be configured to allocate one or more preambles to a group of preambles that are designated for emergency calls. The communication device can be configured to transmit random access preambles at a maximum transmission power and ramp down the transmission power for subsequent transmissions. The communication device can be configured to initiate a second random access procedure and determine whether to continue with the second random access procedure or the first random access procedure while aborting the other.

20 Claims, 7 Drawing Sheets

(56) References Cited

U.S. PATENT DOCUMENTS

2013/0188473 A1\* 7/2013 Dinan ............... H04W 56/0005
370/216
2014/0233492 A1\* 8/2014 Nakashima ........... H04W 72/12
370/329

\* cited by examiner

APPARATUS AND METHOD TO PRIORITIZE A RANDOM ACCESS PROCEDURE FOR EMERGENCY ACCESS

CROSS REFERENCE TO RELATED APPLICATIONS

This patent application claims the benefit of U.S. Provisional Patent Application No. 61/826,200, filed May 22, 2013, entitled "Prioritizing RA Procedure In LTE For RRC Connection Request With Emergency Establishment Cause," which is incorporated herein by reference in its entirety.

BACKGROUND

Field

This application relates generally to wireless communications, including prioritizing random access procedures utilizing radio resource controller connection requests having an emergency Establishment Cause.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure well be described with reference to the accompanying drawings. The drawing in which an element first appears is typically indicated by the leftmost digit(s) in the corresponding reference number.

DETAILED DESCRIPTION

Figure 1:
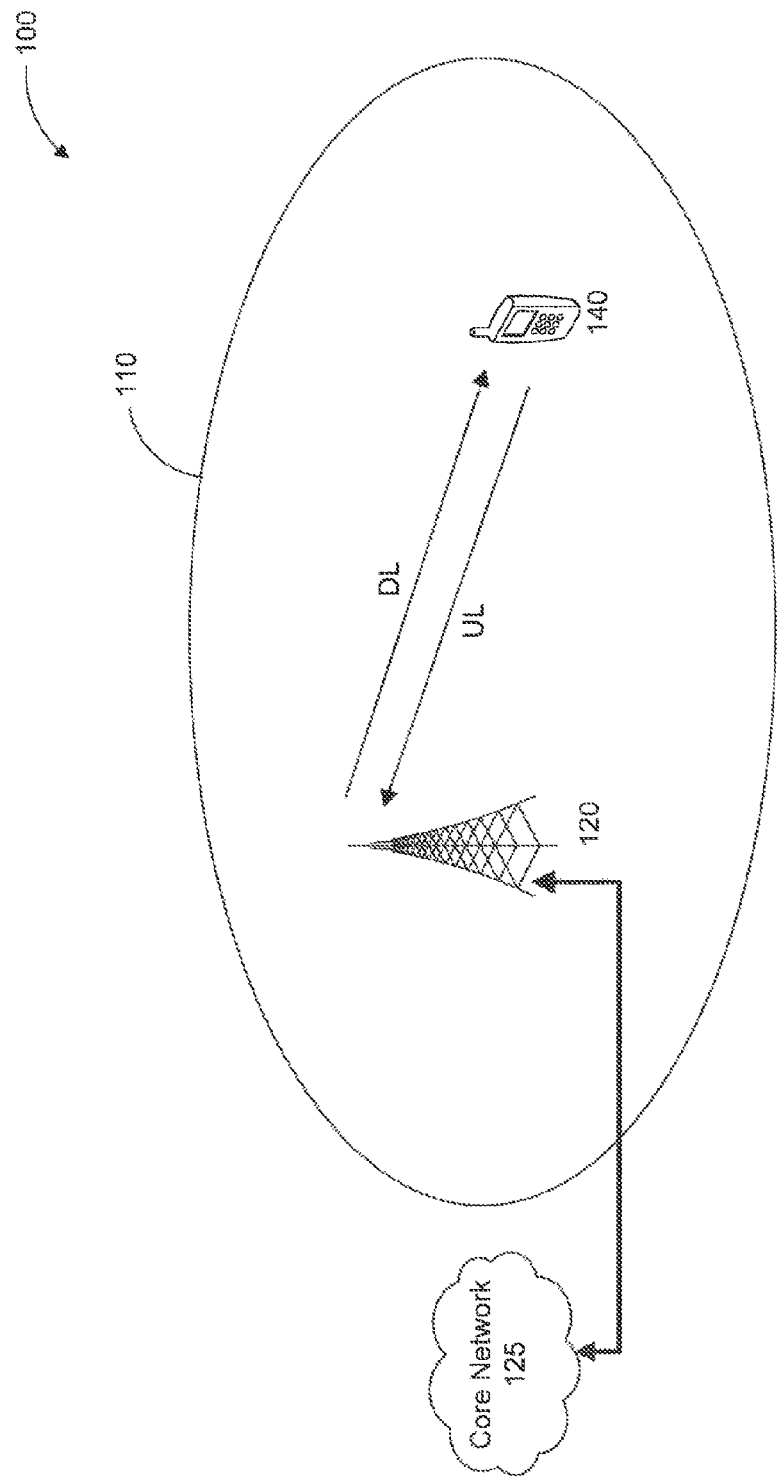
FIG. 1 illustrates an example network environment.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

In the following disclosure, terms defined by the Long-Term Evolution (LTE) standard are sometimes used. For example, the term "eNodeB" or "eNB" is used to refer to what is commonly described as a base station (BS) or a base transceiver station (BTS) in other standards. The term "User Equipment (UE)" is used to refer to what is commonly described as a mobile station (MS) or mobile terminal in other standards. The LTE standard is developed by the 3rd Generation Partnership Project (3GPP) and described in the 3GPP specification and International Mobile Telecomunnications-2000 (IMT-2000) standard, all of which are incorporated by reference in their entirety. Further, 3GPP refers to a communication network as a UTRAN (Universal Mobile Telecommunication System (UMTS) Terrestrial Radio Access Network, a E-UTRAN (Evolved UTRAN), and/or a GERAN (Global System for Mobile Communications (GSM) Enhanced Data rates for GSM Evolution (EDGE) Radio Access Network) to provide some examples.

Although exemplary embodiments are described with reference to LTE, the more generic terms "mobile device" and "base station" are used herein except where otherwise noted to refer to the LTE terms "User Equipment (UE)" and "eNodeB/eNB," respectively. Further, the embodiments are not limited to implementation in LTE, as other communication standards could be used, as will be understood by those skilled in the arts.

As will be apparent to one of ordinary skill in the relevant art(s) based on the teachings herein, exemplary embodiments are not limited to the LTE standard, and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary embodiments are not limited to cellular communication networks and can be used or implemented in other kinds of wireless communication access networks, including (but not limited to) Wireless Local Area Network (WLAN [IEEE 802.11]), Bluetooth (IEEE 802.15.1 and Bluetooth Special Interest Group (SIG)), Near-field Communication (NFC) (ISO/IEC 18092), ZigBee (IEEE 802.15.4), Radio-frequency identification (RFID), and/or infrared communication, to provide some examples. These various standards and/or protocols are each incorporated by reference in their entirety.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

FIG. 1 illustrates an example communication environment 100 that includes one or more base stations 120 and one or more mobile devices 140. The base station(s) 120 and mobile device(s) 140 each include one or more processors, circuitry, and/or logic that is configured to communicate via one or more wireless technologies. The one or more processors can include (and be configured to access) one or more internal and/or external memories that store instructions and/or code that, when executed by the processor(s), cause the processor(s) to perform one or more operations to facilitate communications via one or more wireless technologies as discussed herein. Further, one or more of the mobile devices 140 can be configured to support co-existing wireless communications. The mobile device(s) 140 can include, for example, a transceiver having one or more processors, circuitry, and/or logic that is configured to transmit and/or receive wireless communications via one or more wireless technologies within the communication environment 100. The base station(s) 120 include one or more processors, circuitry, and/or logic that is configured to: (1) receive one or more wired communications via one or more well-known wired technologies (e.g., within a core (backhaul) network 125) and transmit one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies within a core network, and (3) to transmit and/or receive wireless communications via one or more wireless technologies within the communication environment 100. The wireless technologies can include, for example, one or more wireless protocols discussed above. The number of mobile devices 140 and/or base stations 120 are not limited to the numbers shown in the exemplary embodiment illustrated in FIG. 1, and the communication environment 100 can include any number of mobile devices 140 and/or base stations 120 as would be understood by those skilled in the relevant arts without departing from the spirit and scope of the present disclosure.

The mobile device 140 can be configured to communicate with the base station 120 in a serving cell or sector 110 of the communication environment 100. For example, the mobile device 140 receives signals on one or more downlink (DL) channels and transmits signals to the base station 120 on one or more respective uplink (UL) channels. The mobile device 140 can also be configured to communicate with one or more other mobile devices 140 utilizing one or more device-to-device communication connections (e.g., using Bluetooth, Wi-Fi, etc.).

Examples of the mobile device 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some embodiments, the mobile device 140 may be a stationary device, including, for example, a stationary computing device—such as a personal computer (PC), a desktop computer, a computerized kiosk, and an automotive/aeronautical/maritime in-dash computer terminal.

In an exemplary embodiment, the base station 120 includes one or more processors, circuitry, and/or logic that is configured for communications conforming to 3GPP's Long-Term Evolution (LTE) specification (e.g., the base station is an LTE base station), and the mobile device 140 includes one or more processors, circuitry, and/or logic that is configured for communications conforming to 3GPP's LTE specification. The one or more processors, circuitry, and/or logic of the mobile device 140 can be further configured for communications conforming to one or more other 3GPP and/or non-3GPP protocols via one or more device-to-device communication networks established with one or more other mobile devices. In this example, the serving cell or sector 110 is an LTE serving cell or sector. In an exemplary embodiment, the communication of the mobile device 140 with one or more other mobile devices 140 can be a device-to-device communication that bypasses the base station 120.

Those skilled in the relevant art(s) will understand that the base station(s) 120 and the mobile device(s) 140 are not limited to the exemplary 3GPP and non-3GPP wireless protocols discussed herein, and the base station(s) 120 and/or the mobile device(s) 140 can be configured for wireless communications conforming to one or more other 3GPP and/or non-3GPP wireless protocols in addition to, or in the alternative to, the wireless protocols discussed herein.

Figure 2:
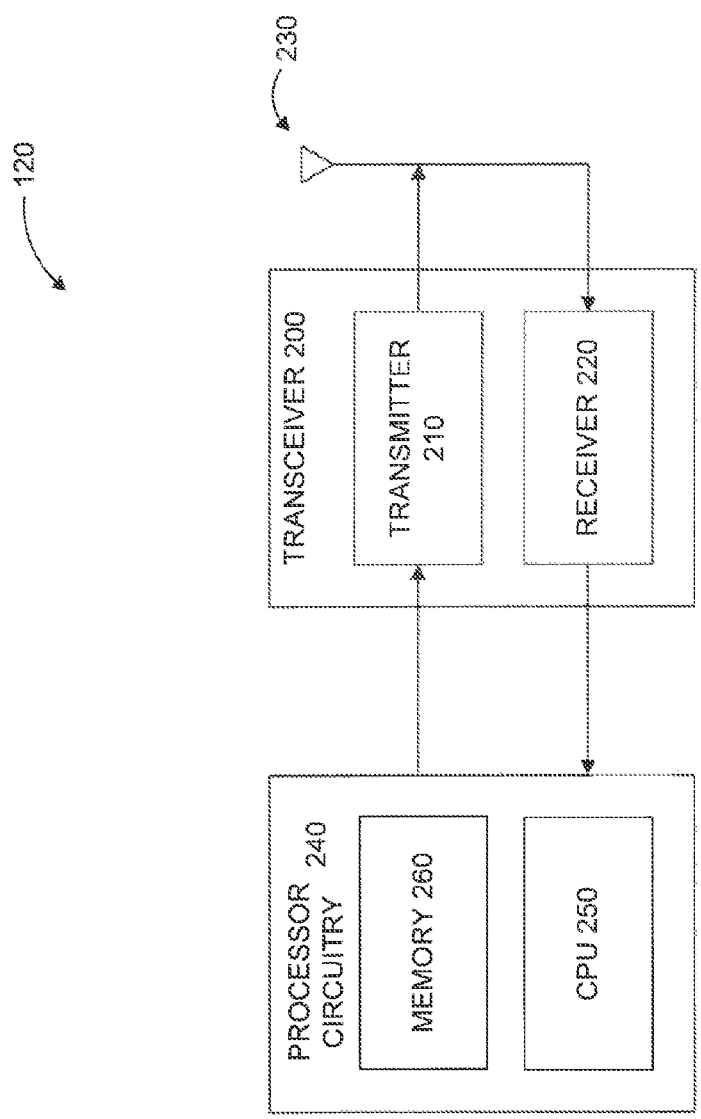
FIG. 2 illustrates a base station according to an exemplary embodiment of the present disclosure.

FIG. 2 illustrates the base station 120 according to an exemplary embodiment of the present disclosure. For example, the base station 120 can include a transceiver 200 communicatively coupled to processor circuitry 240.

The transceiver 200 includes one or more processors, circuitry, and/or logic that is configured to transmit and/or receive wireless communications via one or more wireless technologies within the communication environment 100. In particular, the transceiver 200 can include a transmitter 210 and a receiver 220 that have one or more processors, circuitry, and/or logic configured to transmit and receive wireless communications, respectively, via one or more antennas 230. Those skilled in the relevant art(s) will recognize that the transceiver 200 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the base station 120 can be configured for wireless communication utilizing a Multiple-input Multiple-output (MIMO) configuration.

In an exemplary embodiment, the transceiver 200 is configured for wireless communications conforming to one or more wireless protocols defined by 3GPP. For example, the transceiver 200 is configured for wireless communications conforming to 3GPP's LTE specification. In this example, the transceiver 200 can be referred to as LTE transceiver 200. Those skilled in the relevant art(s) will understand that the transceiver 200 is not limited to communication conforming to 3GPP's LTE specification, and can be configured for communications that conform to one or more other 3GPP protocols and/or one or more non-3GPP protocols. It should be appreciated that the transceiver 200 can be referred to by one or more other 3GPP and/or non-3GPP protocols in embodiments where the transceiver 200 is configured for such other communications conforming to the other 3GPP and/or non-3GPP protocols.

The processor circuitry 240 can include one or more processors (CPUs) 250 and/or circuits configured to carry out instructions to perform arithmetical, logical, and/or input/output (I/O) operations of the base station 120 and/or one or more components of the base station 120. The processor circuitry 240 can further include a memory 260 that stores data and/or instructions, where when the instructions are executed by the processor(s) 250, perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Figure 3:
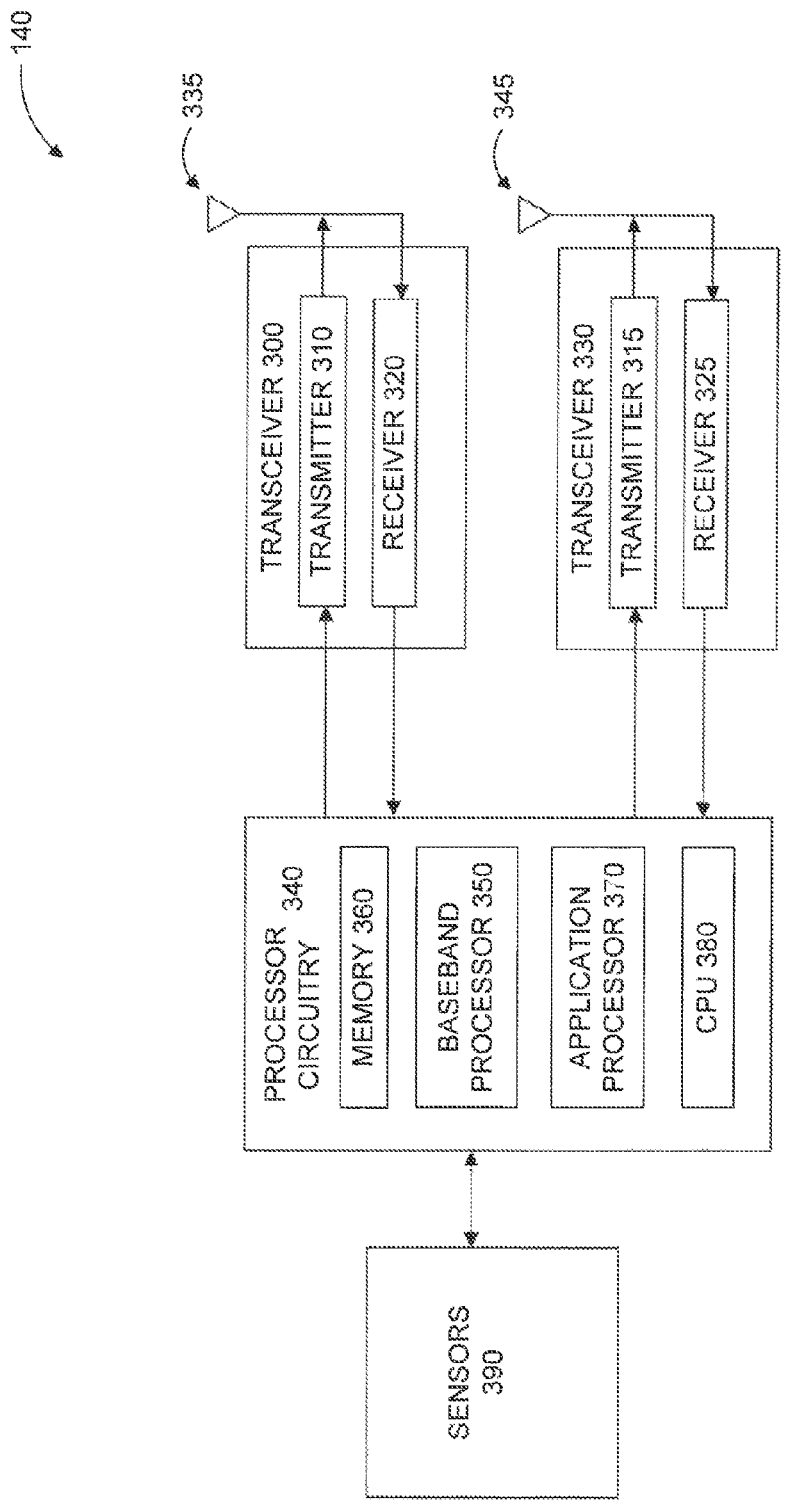
FIG. 3 illustrates a mobile device according to an exemplary embodiment of the present disclosure.

FIG. 3 illustrates the mobile device 140 according to an exemplary embodiment of the present disclosure. The mobile device 140 can include processor circuitry 340 communicatively coupled to one or more transceivers configured to communicate with one or more 3GPP and/or non-3GPP communication protocols. That is, the mobile device 140 can be configured for wireless communications conforming to one or more wireless protocols defined by 3GPP and/or one or more non-3GPP wireless protocols. In an exemplary embodiment, the mobile device 140 includes an LTE transceiver 300 and a WLAN transceiver 330. In this example, the mobile device 140 is configured for wireless communication conforming to 3GPP's LTE specification and for wireless communication conforming to IEEE's 802.11 WLAN specification. Those skilled in the relevant art(s) will understand that the mobile device 140 is not limited to these exemplary 3GPP and non-3GPP wireless protocols, and the mobile device 140 can be configured for wireless communications conforming to one or more other 3GPP and/or non-3GPP wireless protocols in addition to, or in the alternative to, the wireless protocols discussed herein, and/or to a subset of the LTE and WLAN specifications discussed above.

The LTE transceiver 300 includes one or more processors, circuitry, and/or logic that is configured for transmitting and/or receiving wireless communications conforming to 3GPP's LTE specification. In particular, the LTE transceiver 300 can include an LTE transmitter 310 and an LTE receiver 320 that have one or more processors, circuitry, and/or logic configured for transmitting and receiving wireless communications conforming to 3GPP's LTE specification, respectively, via one or more antennas 335. Transceiver 300 need not be limited to LTE, and could operate according to one or more other 3GPP and/or non-3GPP protocols, as will be understood by those skilled in art.

The WLAN transceiver 330 includes one or more processors, circuitry, and/or logic that is configured for transmitting and/or receiving wireless communications conforming to IEEE's 802.11 WLAN specification. In particular, the WLAN transceiver 330 can include a WLAN transmitter 315 and a WLAN receiver 325 that have one or more processors, circuitry, and/or logic configured for transmitting and receiving wireless communications conforming to IEEE's 802.11 WLAN specification, respectively, via one or more antennas 345. Transceiver 330 need not be limited to WLAN, and could operate according to one or more other 3GPP and/or non-3GPP protocols, as will be understood by those skilled in art.

In exemplary embodiments, the LTE transceiver 300 and the WLAN transceiver 330 can include (but are not limited to) a digital signal processor (DSP), modulator and/or demodulator, a digital-to-analog converter (DAC) and/or an analog-to-digital converter (ADC), and/or a frequency converter (including mixers, local oscillators, and filters) that can be utilized in transmitting and/or receiving of wireless communications. Further, those skilled in the relevant art(s) will recognize that antennas 335 and/or 345 may include an integer array of antennas, and that the antennas may be capable of both transmitting and receiving wireless communication signals. It will also be understood by those skilled in the relevant art(s) that any combination of the LTE transceiver 300 and WLAN transceiver 330, as well as one or more other transceivers, circuits, and/or processors may be embodied in a single chip and/or die.

The processor circuitry 340 includes one or more processors, circuitry, and/or logic that is configured to control the overall operation of the mobile device 140, including the operation of the LTE transceiver 300 and WLAN transceiver 330. The one or more processors can include one or more baseband processors 350, one or more application processors 370, and/or one or more other processors (CPUs) 380. As would be understood by those skilled in the relevant arts, any combination of the baseband processor(s) 350, application processor(s) 370 and/or processor(s) 380 may be embodied as a single chip and/or die.

The processor circuitry 340 can further include a memory 360 that stores data and/or instructions, where when the instructions are executed by the processor(s) 350, baseband processor(s) 370, and/or application processor(s) 380, to perform the functions described herein. Similarly, the memory 360 can be any well-known volatile and/or non-volatile memory, and can be non-removable, removable, or a combination of both.

The baseband processor(s) 350 can be configured to control the operation of the LTE transceiver 300 and/or WLAN transceiver 330, including transmitting and/or receiving of wireless communications via the LTE transceiver 300 and/or WLAN transceiver 330, and/or perform one or more baseband processing functions, including (but not limited to), for example, media access control (MAC), encoding/decoding, modulation/demodulation, data symbol mapping, error correction, and the like.

The application processor(s) 370 can be configured to carry out instructions to perform arithmetical, logical, and/or input/output (I/O) operations of the mobile device 140 and/or of one or more components of the mobile device 140. For example, the application processor(s) 370 can be configured to carry out internally-stored instructions and/or instructions stored in memory 360, including the running of one or more applications and/or operating systems, including user selected applications.

The processor(s) 380 can be configured to control the operation of the mobile device 140, including carrying out one or more instructions to perform one or more functions described herein.

In an exemplary embodiment, the mobile device 140 includes one or more other transceivers (not shown) configured to communicate via one or more 3GPP protocols, one or more non-3GPP protocols, and/or one or more other well-known communication technologies. In an exemplary embodiment, the one or more other transceivers can be configured for navigational purposes utilizing one or more well-known navigational systems, including the Global Navigation Satellite System (GNSS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples.

Further, the mobile device 140 can include one or more positional and/or movement sensors 390 (e.g., GPS, accelerometer, gyroscope sensor, etc.) implemented in (and/or in communication with) the mobile device 140. Here, the location and/or movement of the mobile device 140 can be determined using one or more transceivers configured for navigation purposes, one or more of the positional and/or movement sensors 390, and/or one or more positional determinations using signal characteristics relative to one or more base stations and/or access points.

Figure 4:
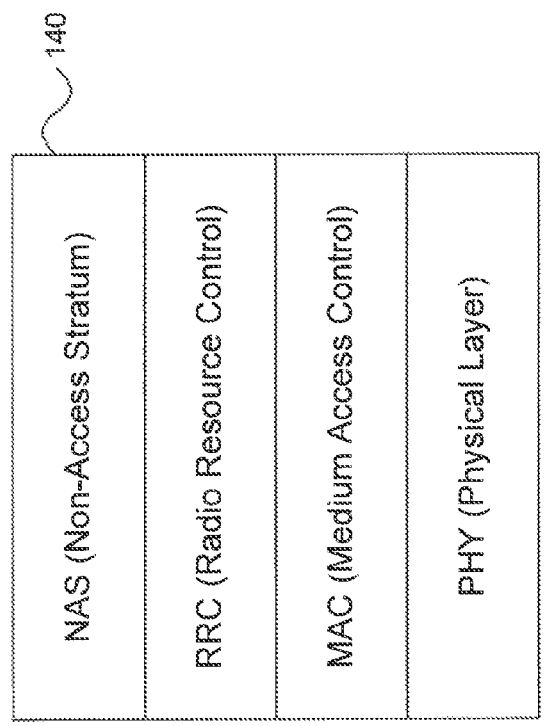
FIG. 4 illustrates a mobile device according to an exemplary embodiment of the present disclosure.

FIG. 4 illustrates a description of the mobile device 140 in accordance with an exemplary embodiment of the present disclosure, where the mobile device 140 can include an architecture having various layers (in order of highest to lowest in the architecture): Non-Access Stratum (NAS) layer, Radio Resource Control (RRC) layer, Media Access Control (MAC) layer, and Physical (PHY) layer. The architecture is not limited to these exemplary layers and can include one or more other layers as would be understood by those skilled in the relevant arts. In exemplary embodiments, the various layers can be implemented in one or more components of the mobile device 140, including, for example, in one or more of the processors and/or transceivers of the mobile device 140. More specifically, one or more of the layers can be implemented in, for example, the baseband processor(s) 350 and/or transceivers 300/330, while one or more other layers can be implemented in the application processor(s) 370. In an exemplary embodiment, the PHY layer is implemented in one or more transceivers 300, 330 and the MAC layer is implemented in the baseband processor(s) 350, and the RRC layer and the NAS layer are implemented in the application processor(s) 370 and/or processor(s) 380. The implementation of the various layers within the mobile device 140 are not limited to these exemplary implementations, and the various layers of the architecture can be implemented in any combination of processors and/or transceivers of the mobile device 140 as would be understood by those skilled in the relevant arts.

As set forth in one or more 3GPP's LTE specifications, the physical layer of LTE utilizes orthogonal frequency division multiplexing (OFDM) for the downlink (DL) and single carrier frequency division multiplexing (SC-FDM) for the uplink (UL). According to the LTE specification, the downlink and uplink transmissions are organized into radio frames each having a duration of 10 millisecond (ms). Here, a radio frame consists of 10 subframes, each subframe consisting of two consecutive 0.5 ms slots. Each slot comprises six OFDM symbols for an extended cyclic prefix and seven OFDM symbols for a normal cyclic prefix. In both the uplink and downlink, data is time and frequency multiplexed by mapping OFDM symbols to a time/frequency resource grid consisting of elementary units called resource elements (REs) that are uniquely identified by the antenna port, sub-carrier position, and OFDM symbol index within a radio frame. A group of resource elements corresponding to twelve consecutive subcarriers within a single time slot is referred to as a resource block (RB). The one or more 3GPP LTE specifications include the European Telecommunications Standard Institute (ETSI) Technical Specification (TS) 136 Series, referred hereinafter as "3GPP TS 36 Series," each of which is incorporated herein by reference in its entirety.

In an exemplary embodiment, and as explained in detail below, the mobile device 140 (e.g., UE) is configured to acquire uplink (UL) resources from the base station 120 (e.g., eNB) for transmitting data by performing a random access (RA) procedure using the physical random access channel (PRACH). The PRACH defines time-frequency resources allocated by the base station 120 for use by mobile device 140 in performing the RA procedure. The mobile device 140 can also be configured to use the random access (RA) procedure to acquire uplink resources for subsequent data transmission, typically when periodic scheduling request (SR) resources are not allocated to the mobile device 140 by the communication environment 100. The PRACH resources are shared among mobile devices 140 operating in a connected mode and mobile devices 140 operating in an idle mode. In operation, the communication environment 100 can be configured to perform back-off operations in response to collisions between mobile devices 140 utilizing the PRACH resources.

When the mobile device 140 (e.g., UE) is in a connected state, uplink and downlink resources are allocated by the base station 120 (e.g., eNB). In this example, the allocation of downlink resources by the base station 120 can be referred to as "downlink synchronization." At the physical level (e.g., PHY layer), the uplink and downlink resources are segregated into separate physical channels. The mobile device 140 is allocated resources in the physical uplink control channel (PUCCH) for requesting resources for transmitting data to the base station 120 over the physical uplink shared channel (PUSCH). If the mobile device 140 has not been allocated resources on the PUCCH for transmitting such a scheduling request, the mobile device 140 may use a random access (RA) procedure for the scheduling request.

In performing a random access (RA) procedure, the base station 120 is configured to reserve time-frequency resources for use by the mobile device 140. These resources are referred to as the physical random access channel (PRACH). In operation, the base station 120 broadcasts the location of the PRACH in the time-frequency grid to the mobile devices 140 in a system information block (SIB) message. The mobile device 140 can be configured to utilize a random access procedure for several purposes, including, for example: initial access to establish a connection with the base station 120, transitioning from an idle state to a connected state, establishing or re-establishing synchronization with the base station 120, and/or during a handover process to a new cell. In exemplary embodiments, and as discussed in more detail below, the mobile device 140 can be configured to utilize a random access procedure to perform an emergency call.

Random access procedures are discussed in detail in European Telecommunications Standard Institute (ETSI) Technical Specification (TS) 136 321 V103.0 (2013-02) (LTE; Evolved Universal Terrestrial Radio Access (E-UTRA); Medium Access Control (MAC) protocol specification), referred hereinafter as "3GPP TS 36.321," which is incorporated herein by reference in its entirety.

A random access procedure can be initiated by an instruction received over the physical downlink control channel (PDCCH) or by the medium access control (MAC) layer. For example, if the mobile device 140 receives a PDCCH transmission consistent with a PDCCH instruction, the mobile device 140 can be configured to initiate a random access procedure. In exemplary embodiments, the mobile device 140 can be configured to establish an emergency call before the institution of a random access procedure. In these examples, the mobile device 140 can configure the common control channel (CUTE) before providing a connection establishment request to the MAC layer (i.e., before the institution of a random access procedure). The configured CCCH can provide the MAC layer with an Establishment Cause that can prioritize one or more subsequent random access procedures. For example, the radio resource control (RRC) layer can be configured to provide the MAC layer with the CCCH, including the Establishment Cause, to indicate the subsequent random access procedure is to be prioritized for an emergency call.

In an exemplary embodiment, the common control channel (CCCH) is configured to include an Establishment Cause in addition to the various parameters that are defined in ETSI TS 136 331 V10.12.0 (2014-01), referred hereinafter as the "3GPP TS 36.331 specification," which is incorporated herein by reference in its entirety. The CCCH configuration in accordance with an exemplary embodiment is shown below in Table 1.

TABLE 1

| Parameters | Value | Description |
| --- | --- | --- |
| PDCP configuration | N/A | |
| RLC configuration | TM | |
| MAC configuration | | Normal MAC headers are used |
| Logical channel configuration | | |
| Priority | 1 | Highest priority |
| prioritisedBitRate | Infinity | |
| bucketSizeDuration N/A | N/A | |
| logicalChannelGroup 0 | 0 | |
| logicalChannelSR-Mask-r9 | release | |
| Establishment Cause | 0 or 1 | 0 = Emergency Call; 1 = Normal operation |

In exemplary embodiments, the mobile device 140 can be configured to prepare the common control channel (CCCH) to include the Establishment Cause as shown above in Table 1. The Establishment Cause can be configured in the RRC layer by the NAS layer and provided from the RRC layer to the MAC layer. The MAC layer can then prioritize a subsequent random access procedure for the establishment of an emergency call, as discussed in more detail below, utilizing the CCCH that includes the Establishment Cause.

As discussed above, the base station 120 is configured to reserve time-frequency resources for use by the mobile device 140. The resources are referred to as the physical random access channel (PRACH). In operation, the base station 120 broadcasts the location of the PRACH in the time-frequency grid to the mobile devices 120 in a system information block (SIB) message.

In an exemplary embodiment, the PRACH is configured to identify one or more random access preambles that are to be utilized by the mobile device 120 during the random access procedure. For example, a plurality of random access preambles can be segregated into two groups: Group A and Group B. The PRACH can further identify how the preambles of each of the groups are to be utilized in the random access procedure. The selection between the groups of preambles can be based on, for example, the total number of random access preambles (numberOfRA-Preambles) and/or the number of random access preambles in Group A (sizeOfRA-PreamblesGroupA) In operation, the number of random access preambles in Group B can be identified by subtracting the number of preambles in Group A from the total number of preambles (e.g., number of preambles in Group B=numberOfRA-Preambles−sizeOfRA-PreamblesGroupA). The selection can be further based on one or more other parameters as defined in ETSI TS 136 321 V11.5.0 (2014-03), referred hereinafter as the "3GPP TS 36.321 specification," which is incorporated herein by reference in its entirety, and/or one or more parameters as would be understood by those skilled in the relevant arts. In an exemplary embodiment, the Group A preambles can be used for initial connections to the base station 120 by the mobile devices 140 while Group B preambles can be used for random access procedures by the mobile devices 140 that have previously been connected with the base station 120 (i.e. previously served), but have been idle for a predetermined period of time.

In exemplary embodiments, the PRACH can identify a maximum transmission power so that the mobile devices 140 do not saturate the base station 120, herein known as a "saturation power" (i.e., a transmission power level just below that which causes saturation at the base station). The mobile device 140 can then be configured to determine the power at which the random access channel (RACH) is to be sent out by the PHY layer to the base station 120. The transmission power can be determined using the following equation:

$$preambleReceivedTargetPower = \\ preambleInitialReceivedTargetPower + DELTA\_PREAMBLE + \\ (PREAMBLE\_TRANSMISSION\_COUNTER - 1) \times \\ powerRampingStep$$

Where the preambleInitialReceivedTargetPower is the initial preamble power, the DELTA_PREAMBLE is the preamble format based offset, the PREAMBLE_TRANSMISSION_COUNTER is the number of preambles that have been transmitted, and the powerRampingStep is a power-ramping factor (an integer >0). In operation, the transmission power is increased for each subsequent preamble transmission attempt in increments of the powerRampingStep. For example, for the initial preamble transmission, the preambleReceivedTargetPower=preambleInitialReceived TargetPower+DELTA_PREAMBLE as the PREAMBLE_TRANSMISSION_COUNTER initially is set one. For the next preamble transmission attempt, the value of the PREAMBLE_TRANSMISSION_COUNTER is two. Here, the value of the preambleReceivedTargetPower is increased by a single factor (e.g., 2−1=1) of the powerRampingStep. A next preamble transmission attempt would increase the transmission power by two factors (e.g., 3−1=2) of the powerRampingStep, and so on. The transmission power is discussed in detail in §5.1 of the 3GPP TS 36.321 specification.

In operation, to begin a random access procedure, the mobile device 140 is configured to transmit a random access preamble on the physical random access channel (PRACH). The transmission of the random access preamble initiates an exchange of messages between the mobile device 140 and the base station 120. The exchange may either be contention-based or non-contention-based. In response to the random access procedure, the mobile device 120 receives resources for uplink transmission, an initial value for the uplink timing advance and, if it does not already have one, a C-RNTI (cell-specific radio network temporary identifier) that identifies the mobile device 140 and enables the mobile device 140 to decode information in the physical downlink control channel (PDCCH) intended for it.

Figure 5:
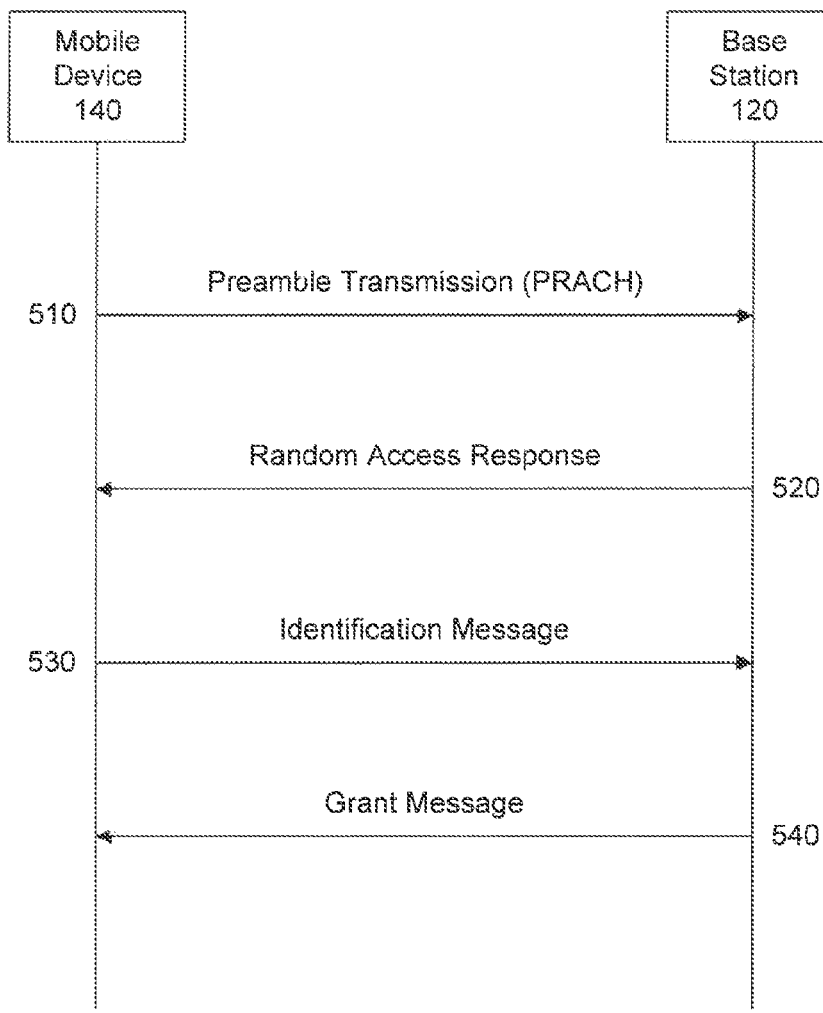
FIG. 5 illustrates a flowchart of a random access procedure according to an exemplary embodiment of the present disclosure.

FIG. 5 illustrates a flowchart 500 of a random access procedure in accordance with an exemplary embodiment of the present disclosure. The method of flowchart 500 is described with continued reference to one or more of FIGS. 1-4. The steps of the method of flowchart 500 are not limited to the order described below, and the various steps may be performed in a different order. Further, two or more steps of the method of flowchart 500 may be performed simultaneously with each other.

The method of flowchart 500 begins at step 510, where the mobile device 140 is configured to transmit a random access preamble to the base station 120 using the PRACH. In this example, the preamble transmission indicates to the base station 120 that the mobile device 140 is performing a random access procedure and also allows the base station 120 to estimate the transmission delay between the mobile device 140 and the base station 120 for adjusting uplink timing. The preamble transmission can include a Random Access Radio Network Temporary Identifier (RA-RNTI) associated with the PRACH used in the transmission of the random access preamble.

After step 510, the method of flowchart 500 transitions to step 520, where the base station 120 is configured to transmit a random access response to the mobile device 140. The random access response includes a timing advance command that allows the mobile device 140 to adjust the timing of the mobile device's 140 uplink transmission based on the transmission delay estimate determined in step 510. The mobile device 140 is also configured to determine uplink resources identified by the base station 120 in the random access response. The random access response is transmitted over a Physical Downlink Shared Channel (PDSCH) resource that is identified with a PDCCH transmission reserved for random access responses. The base station 120 can also be configured to include a back-off command if the base station 120 detects a collision due to multiple mobile devices 140 attempting random access procedures. The back-off command instructs the mobile device 140 to delay a subsequent random access procedure. In operation, the mobile device 140 is configured to monitor the PDCCH for a random access response identified by the Random Access Radio Network Temporary Identifier (RA-RNTI) defined in the random access preamble transmission. If the random access response contains the random access preamble identifier (e.g., RA-RNTI) corresponding to the transmitted random access preamble, the mobile device 140 determines that the random access response was successfully received. If no random access response is received by the mobile device 140 within the predetermined random access response window, or if none of the received random access responses contains the random access preamble identifier (e.g., RA-RNTI), the mobile device 140 determines that the random access response reception has been unsuccessful. In these examples, the mobile device 140 can be configured to perform random access response reception processing as defined in section 5.1.4 of the 3GPP TS 36.321 specification. For example, the mobile device 140 can return to step 510, where the mobile device 140 is configured to increment the PREAMBLE_TRANSMISSION_COUNTER by 1, and select and transmit another random access resource (e.g., random access preamble).

After step 520, the method of flowchart 500 transitions to step 530, where the mobile device 140 is configured to transmit an identification message to the base station 120 using a Physical Uplink Shared Channel (PUSCH) resource assigned to the mobile device 140 by the base station 120 during the identification of uplink resources with the random access response. In operation, the mobile device 140 is configured to transmit the identification message in response to a successful receipt of the random access response. The mobile device 140 can be configured to await receipt of a Hybrid Automatic repeat request (HARQ) acknowledgment (ACK) from the base station 120. The mobile device 140 determines that the identification message was successfully received by the base station 120 upon receipt of the HARQ ACK from the base station 120. That is, the HARQ ACK acknowledges that the identification message was successfully received by the base station 120.

In exemplary embodiments, the identification message may include a scheduling request by the mobile device 140, and the identification message can be included in an msg3 message. For example, the msg3 message can include a Cell Radio Network Temporary Identifier (C-RNTI) Media Access Control (MAC) Control Element (CE) or a common control channel (CCCH) Service Data Unit (SDU), submitted from one or more upper layers and associated with the mobile device 140 Contention Resolution Identity.

After step 530, the method of flowchart 500 transitions to step 540, where the base station 120 is configured to transmit a grant message to the mobile device 140 using the PDSCH. The grant message resolves any contention due to multiple mobile devices 140 performing a random access procedure using the same preamble and receiving the same random access response from the base station 120. Here, the mobile device 140 is granted uplink resources if the random access procedure is successful.

A non-contention-based random access procedure is similar to the method of flowchart 500 and would involve only steps 510 and 520 discussed above. In a non-contention-based random access procedure, the base station 120 is configured to allocate a dedicated preamble to the mobile device 140.

In an exemplary embodiment, the base station 120 can be configured to segregate the plurality of random access preambles into three preamble groups. For example, the base station 120 can be configured to segregate the plurality of random access preambles into three groups: Group A, Group B, and Group C. In these examples, the PRACH is used to identify the plurality of random access preambles that are to be utilized by the mobile device 120 during the random access procedure, and the group from among the three groups each of the preambles is associated with. The PRACH can also identify how the preambles of each of the groups are to be utilized in the random access procedure.

In exemplary embodiments, the Group A preambles can be used for initial connections to the base station 120 by the mobile devices 140 while Group B preambles can be used for random access procedures by the mobile devices 140 that have previously been connected to the base station 120 but have been idle for a predetermined period of time. Herein, "previously connected" to the base station means that the mobile device has been previously served by the base station 120 for communications. The preambles of Group C can be used for emergency services (e.g., emergency calls). A message can be sent using the PRACH channel to identify the RA preambles to the mobile devices, and the assignment of the RA preambles to the various Groups. The functional purpose (i.e. initial connection, previous connection, emergency call) of the Groups and be provided a priori, or alternatively also provided using the PRACH channel.

In these exemplary embodiments, the base station 120 can identify the number of preambles in Group B (sizeOfRA-PreamblesGroupB) in addition to the number of total random access preambles (numberOfRA-Preambles) and the number of preambles in Group A (sizeOfRA-PreamblesGroupA). The set of random access preambles in Group C can be {(sizeOfRA-PreamblesGroupB), (numberOfRA-Preambles−1)}. Similarly, the set of random access preambles in Group B can be {(sizeOfRA-PreamblesGroupA), (sizeOfRA-PreamblesGroupB−1)} and the set of random access preambles in Group A can be {0, (sizeOfRA-PreamblesGroupA−1)}.

In operation, the base station 120 is configured to reserve time-frequency resources for use by the mobile device 140. The resources are referred to as the physical random access channel (PRACH). In operation, the base station 120 broadcasts the location of the PRACH in the time-frequency grid to the mobile devices 120 in a system information block (SIB) message. The PRACH is used to identify one or more random access preambles that are to be utilized by the mobile device 120 during the random access procedure. In exemplary embodiments, the PRACH is used identify the three groups of random access preambles (Group A, Group B and Group C), where the preambles of Group C are utilized for emergency calls.

In these examples, the mobile device 140 is configured to utilize the resources identified by the PRACH in the performance of random access procedures. More specifically, the mobile device 140 can be configured to select a preamble from Group C to establish an emergency call. For example, the mobile device 140 can be configured to prepare the common control channel (CCCH) to include the Establishment Cause as discussed above and shown in Table 1. The Establishment Cause can be configured in the RRC layer by the NAS layer, and provided to the MAC layer by the RRC layer. The Establishment Cause of the received CCCH causes the MAC layer to select a random access preamble from Group C for the following random access procedure. In using preambles from Group C that are set aside for emergency calls, the mobile device 140 can reduce collisions with the random access procedures of one or more other mobile devices that are being performed for non-emergency purposes, as such procedure would utilize preambles from Group A or Group B.

In an exemplary embodiment, the base station 120 can utilize a PRACH that identifies two groups of random access preambles (Group A and Group B) for emergency services in addition to, or instead of, Group C. That is, the PRACH may identify two groups of preambles, where both preamble groups are used for emergency services, or may identify three groups (A, B and C), where any combination of Groups A, B or C may be used for emergency services. In these examples, the base station 120 can be configured to identify (using the PRACH) how the preambles of each of the groups are to be utilized in the random access procedure. For example, the base station 120 can determine that one or more of the Groups of preambles can be used for emergency calls irrespective of whether the connection to the base station 120 is an initial connection or a connection from a previously associated mobile device 140. In an exemplary embodiment, the base station 120 can be configured to determine that the preambles from Groups A and B can be used for emergency purposes. Therefore, the mobile device 140 attempting to establish an emergency call can utilize preambles from Groups A and B when performing a random access procedure for emergency services. That is, the mobile device 140 is not limited to only using preambles from Group A if the connection to the base station 120 is, for example, an initial connection, or only using preambles from group B if the connection to the base station 120 is, for example, from a mobile device 140 having been previously connected. For example, if the mobile device 140 is attempting to establish an emergency call and the connection to the base station 120 is an initial connection, the mobile device 140 can utilize random access preambles from Groups A and B exemplary embodiments where Group C is not defined, or any combination of Groups A, B or C in exemplary embodiments that include third group (i.e., Group C). This can reduce collisions with the random access procedures of one or more other mobile devices that are being performed for non-emergency purposes.

In exemplary embodiments, the mobile device 140 can be configured to utilize a transmission power at or near the maximum transmission power (e.g., at the saturation power) and ramp down the transmission power for subsequent transmissions of the random access preamble associated with the establishment of an emergency call. That is, the mobile device 120 can be configured to utilize a higher transmission power for the initial transmission of the random access preamble, and ramp down the transmission power by a factor of the power ramping step for each subsequent transmission attempt, if the first attempt is not successful. The transmission power can be determined using the following equation:

$$\text{preambleReceivedTargetPower} = \text{preambleInitialReceivedTarget} \\ \text{Power} + \text{DELTA\_PREAMBLE} + (\text{preambleTrans-} \\ \text{Max} - \text{PREAMBLE\_TRANSMISSION\_COUN-} \\ \text{TER}) \times \text{powerRampingStep}$$

Where the preambleInitialReceivedTargetPower is the initial preamble power, the DELTA_PREAMBLE is the preamble format based offset, the preambleTransMax is the maximum number of preamble transmissions (an integer >0), the PREAMBLE_TRANSMISSION_COUNTER is the number of preambles that have been transmitted (preambleTransMax ≥ an integer ≥1), and the powerRampingStep is a power-ramping factor (an integer >0). For the purposes of this discussion, the preambleTransMax can be referred to as an upper threshold number of RA preambles transmission attempts. In operation, the transmission power is decreased for each subsequent preamble transmission attempt in increments of the powerRampingStep. In exemplary embodiments, the preambleTransMax, DELTA_PREAMBLE, and/or powerRampingStep are determined by the base station 120 and provided to the mobile device 140.

For example, for the initial preamble transmission power is equal to preambleInitialReceivedTargetPower+DELTA_PREAMBLE+powerRampingStep×(preambleTransMax−1) as the PREAMBLE_TRANSMISSION_COUNTER initially is set to a value of one. That is, the transmission power for the initial preamble transmission is the initial transmission power value plus the addition of a maximum factor of the powerRampingStep. That is, the transmission power for the initial preamble transmission is equal to, or substantially equal to, the saturation power. For the next preamble transmission attempt, the value of the PREAMBLE_TRANSMISSION_COUNTER is two. Here, the increase in the PREAMBLE_TRANSMISSION_COUNTER reduces the value multiplied by the powerRampingStep; and therefore, reduces the transmission power. For example, if the preambleTransMax equals five (e.g., upper threshold number of RA preamble transmission attempts=5), the transmission power includes a quadrupled (e.g., 5-1) powerRampingStep, while the next preamble transmission attempt would include a lower transmission power as the transmission power would include a tripled (e.g., 5-2) powerRampingStep. As another example, when the preambleTransMax is equal to the PREAMBLE_TRANSMISSION_COUNTER, the transmission power is equal to the preambleInitialReceivedTargetPower+DELTA_PREAMBLE. That is, the transmission power is at or near a minimum transmission power value. For the purposes of this discussion, the minimum transmission power value can be referred to as a low threshold transmission power value (i.e., a low threshold value).

In an exemplary embodiment, the mobile device 140 can be configured to utilize a transmission power at or near the maximum transmission power (e.g., saturation power) for each preamble transmission associated with an emergency call. That is, the mobile device 140 can be configured to utilize a transmission power at or near the maximum transmission power without ramping down the transmission power for subsequent transmissions of the random access preamble. In this example, the transmission power can be determined using the following equation:

preambleReceivedTargetPower=preambleInitialReceivedTarget Power+DELTA_PREAMBLE+(preambleTrans-Max−1)×powerRampingStep In an exemplary embodiment, the mobile device 140 can be configured to utilize a transmission power at or near the maximum transmission power (e.g., saturation power) for each preamble transmission associated non-emergency calls in addition to emergency calls. In these examples, the mobile device 140 can be configured to utilize the ramping down of the transmission power, or the mobile device 140 can be configured to utilize the maximum or near maximum transmission power for each preamble transmission without the ramping down of the transmission power.

Figure 6:
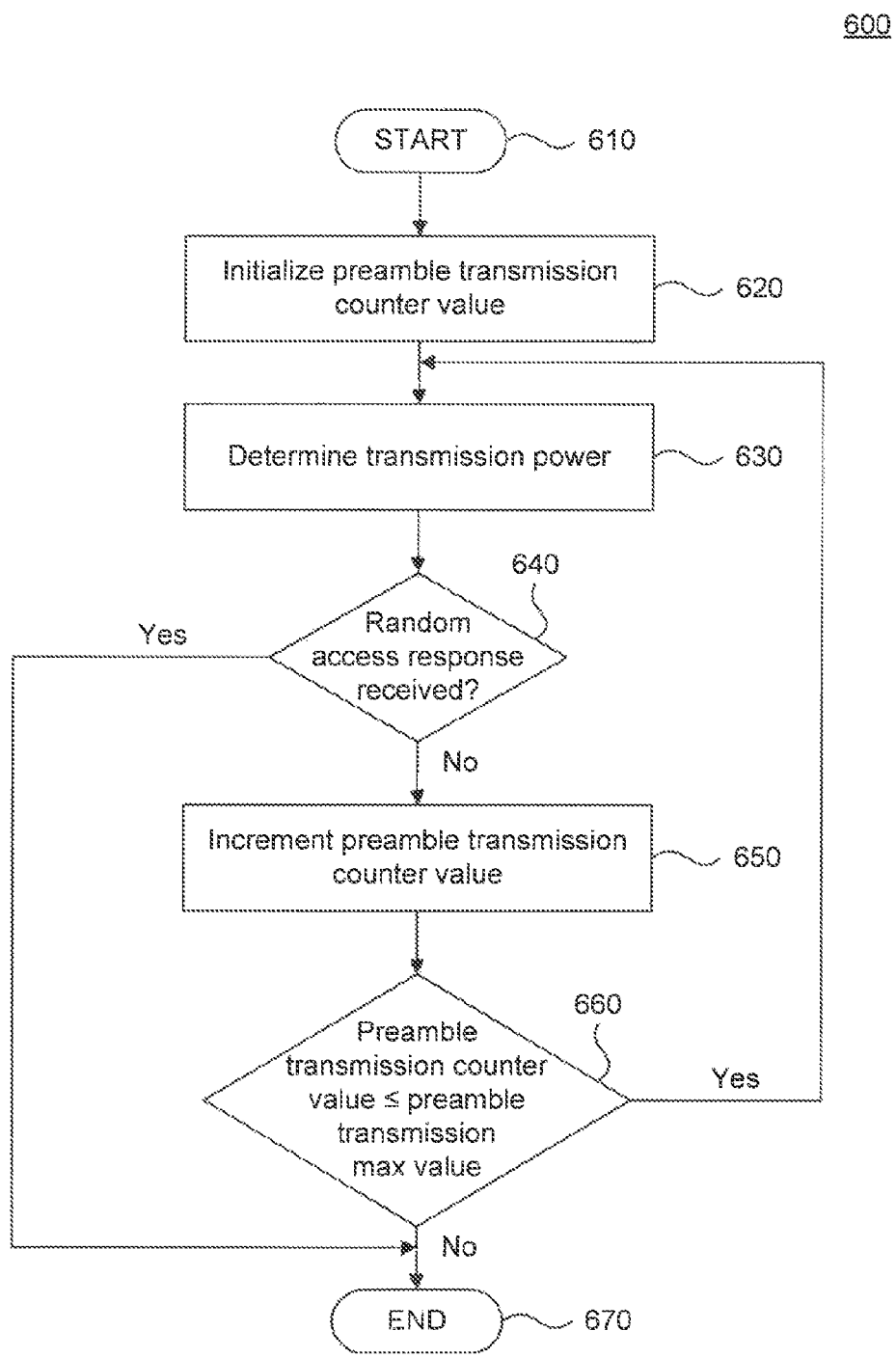
FIG. 6 illustrates a flowchart of a transmission power adjustment method according to an exemplary embodiment of the present disclosure.

FIG. 6 illustrates a flowchart 600 of a transmission power adjustment method for random access preamble transmissions in accordance with an exemplary embodiment of the present disclosure. The method of flowchart 600 is described with continued reference to one or more of FIGS. 1-5. The steps of the method of flowchart 600 are not limited to the order described below, and the various steps may be performed in a different order. Further, two or more steps of the method of flowchart 600 may be performed simultaneously with each other.

The method of flowchart 600 begins at step 610 and transitions to step 620, where the mobile device 140 is configured to initialize the value of the PREAMBLE_TRANSMISSION_COUNTER and set the value to 1.

After step 620, the flowchart 600 transitions to step 630, where the transmission power value is determined based on an initial transmission power value and a factor of the power ramping step value.

In an exemplary embodiment, the transmission power (preambleReceivedTargetPower) can be determined using the following equation:

preambleReceivedTargetPower=preambleInitialReceivedTarget Power+DELTA_PREAMBLE+(preambleTrans-Max−PREAMBLE_TRANSMISSION_COUNTER)×powerRampingStep Here, the preambleInitialReceivedTargetPower is the initial preamble power, the DELTA_PREAMBLE is the preamble format based offset, the preambleTransMax is the maximum number of preamble transmission (an integer >0) (e.g., the upper threshold number of RA preambles transmission attempts), the PREAMBLE_TRANSMISSION_COUNTER is the number of preambles that have been transmitted (preambleTransMax ≥ an integer ≥1), and the powerRampingStep is a power-ramping factor (an integer >0).

After step 630, the flowchart 600 transitions to step 640, where the mobile device 140 is configured to determine if a random access response has been received (e.g., from the base station 120) indicating that the random access preamble has been successfully received by the base station 120. In an exemplary embodiment, the random access responses is received over a Physical Downlink Shared Channel (PDSCH) resource that is identified with a PDCCH transmission reserved for random access responses.

If the random access response has been received by the mobile device (YES at step 640), the flowchart 600 transitions to step 670 where the flowchart ends. Otherwise (NO at step 640), the flowchart 600 transitions to step 650.

At step 650, the mobile device 140 is configured to increment the value of the PREAMBLE_TRANSMISSION_COUNTER. In an exemplary embodiment, the value is incremented by 1. However, the value can be incremented by any value as would be understood by those skilled in the relevant arts.

After step 650, the flowchart 600 transitions to step 660, where the mobile device 140 is configured to compare the value of the PREAMBLE_TRANSMISSION_COUNTER to the preambleTransMax value. If the PREAMBLE_TRANSMISSION_COUNTER value is less than or equal to the preambleTransMax value (YES at step 660), the flowchart 600 returns to step 630. Otherwise (NO at step 660), the flowchart transitions to step 670 where the flowchart ends.

In exemplary embodiments, the mobile device 140 can be configured to perform two or more concurrent random access procedures to establish an emergency call. In these examples, the mobile device 140 is configured to initiate a second (or more) random access procedure when an acknowledgment associated with prior random access procedure has not been received by the mobile device 140 within a predetermined amount of time.

For example, the mobile device 140 can be configured to determine whether a Hybrid Automatic repeat request (HARQ) Acknowledgement (ACK) has been received from the base station 120 by the mobile device 140. In this example, the HARQ ACK is used to acknowledge that the base station 120 has received the identification message (e.g., msg3) from the mobile device 120.

The mobile device 140 is configured to determine the amount of time that has passed since the msg3 transmission. In an exemplary embodiment, the mobile device 140 is configured to determine the number of subframes that have passed since the transmission of the msg3 message. The mobile device 140 is further configured to compare the elapsed time to a predetermined time threshold. For example, the mobile device 140 is configured to compare the number of elapsed subframes to a predetermined threshold of subframes. For example, in a random access procedure, if the number of subframes since transmission of the msg3 message exceeds a predetermined threshold of subframes, the mobile device 140 can be configured to institute another random access procedure. In an exemplary embodiment, the mobile device 140 is configured to institute a second, concurrent random access procedure if the mobile device 140 has not received a HARQ ACK for the msg3 transmission within, for example, four subframes. In exemplary embodiments, the second random access procedure is instituted immediately or after applying the randombackoff time as defined in section 5.1.5 of 3GPP TS 36.321 but before the mac-ContentionResolutionTimer expires.

In an exemplary embodiment, the mobile device 140 can be configured to limit the number of random access procedures awaiting HARQ ACK for msg3 transmissions to one. That is, the mobile device 140 can be configured to prevent more than one random access transmission that is awaiting a HARQ ACK for an msg3 transmission. In this example, the mobile device 140 can be configured to abort the initial random access procedure if the second random access procedure reaches the stage of transmitting an msg3 message. Here, the initial random access procedure is aborted and the second random access procedure is continued so that an msg3 message is transmitted as a part of the second random access procedure. In this scenario, by the time the second random access procedure is prepared for an msg3 transmission, the initial random access procedure would likely have had multiple opportunities (e.g., 3 attempted msg3 transmissions) to transmit the msg3 message without receiving a HARQ ACK.

It should be appreciated that the concurrent random access procedure process is not limited to establishing emergency calls, and in an exemplary embodiment, the mobile device 140 can be configured to perform two or more concurrent random access procedures for non-emergency calls.

Figure 7:
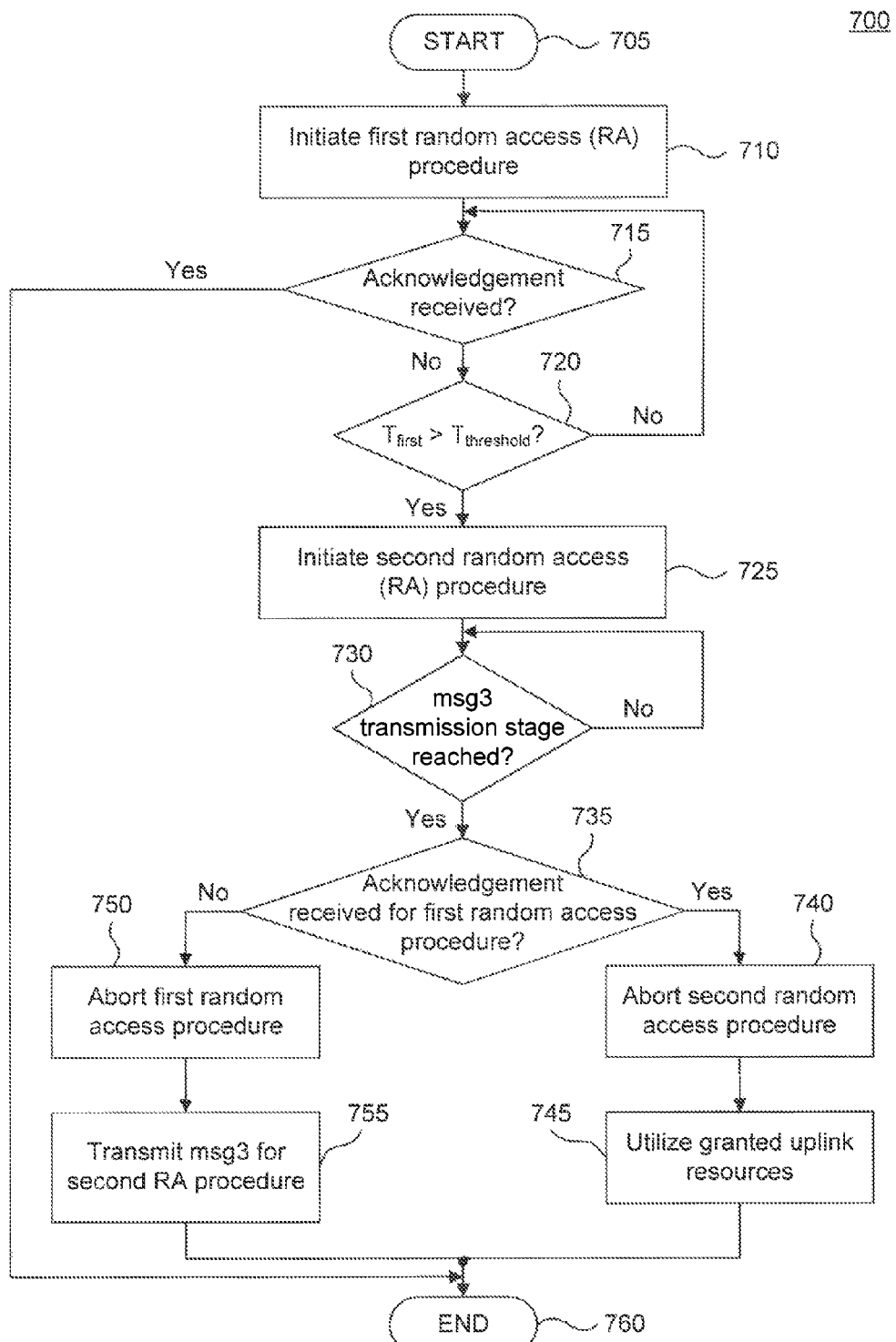
FIG. 7 illustrates a flowchart of a random access procedure according to an exemplary embodiment of the present disclosure.

FIG. 7 illustrates a flowchart 700 of a random access procedure in accordance with an exemplary embodiment of the present disclosure. The method of flowchart 700 is described with continued reference to one or more of FIGS. 1-6. The steps of the method of flowchart 700 are not limited to the order described below, and the various steps may be performed in a different order. Further, two or more steps of the method of flowchart 700 may be performed simultaneously with each other.

The method of flowchart 700 begins at step 705 and transitions to step 710, where the mobile device 140 is configured to initiate a first random access procedure. In an exemplary embodiment, the mobile device 140 is configured to transmit one or more msg3 messages to the base station 120.

After step 710, the method of flowchart 700 transitions to step 715, where the mobile device 140 can be configured to determine if a Hybrid Automatic repeat request (HARQ) Acknowledgement (ACK) has been received from the base station 120. In this example, the HARQ ACK is used to acknowledge that the base station 120 has received the msg3 transmission from the mobile device 120 that is associated with the first random access procedure.

If the mobile device 140 has received a HARQ ACK (YES at step 715), the flowchart transitions to step 750 where the flowchart 700 ends. Otherwise (NO at step 715), the flowchart 700 transitions to step 720.

At step 720, the mobile device 140 is configured to determine the time elapsed ($T_{first}$) since the msg3 transmission of the first random access procedure and to compare the elapsed time ($T_{first}$) to a predetermined time threshold ($T_{threshold}$). In an exemplary embodiment, the mobile device 140 is configured to determine the number of subframes that have passed since the msg3 transmission and to compare the number of elapsed subframes to a predetermined subframe threshold.

If the elapsed time is greater than the predetermined time threshold ($T_{first} > T_{threshold}$) (YES at step 720), the flowchart 700 transitions to step 725. Otherwise (NO at step 720), the flowchart returns to step 715.

At step 725, the mobile device 140 is configured to initiate a second random access procedure. In an exemplary embodiment, the mobile device 140 is configured to transmit one or more msg3 messages to the base station 120 for the second random access procedure.

After step 725, the method of flowchart 700 transitions to step 730, where the mobile device is configured to determine if the second random access procedure reaches the stage of msg3 transmission. If the second random access procedure has reached the msg3 transmission stage (YES at step 730), the flowchart 700 transitions to step 735. Otherwise (NO at step 730), the flowchart 700 returns to step 730 and step 730 is repeated.

At step 735, the mobile device 140 is configured to determine if an acknowledgment has been received for an msg3 transmission of the first random access procedure. For example, the mobile device 140 can be configured to determine if a HARQ ACK for an msg3 transmission of the first random access procedure has been received.

If an acknowledgement for an msg3 transmission of the first random access procedure has been received (YES at step 735), the flowchart 700 transitions to step 740, where the mobile device 140 is configured to abort the second random access procedure. After step 740, the flowchart 700 transitions to step 745, where the mobile device 140 is configured to utilize uplink resources granted to the mobile device 140 by the base station 120. After step 745, the flowchart 700 transitions to step 760 where the flowchart 700 ends.

If an acknowledgement for an msg3 transmission of the first random access procedure has not been received (NO at step 735), the flowchart 700 transitions to step 750, where the mobile device 140 is configured to abort the first random access procedure. After step 750, the flowchart 700 transitions to step 755, where the mobile device 140 is configured to transmit the msg3 message associated with the second random access procedure. After step 755, the flowchart transitions to step 760 where the flowchart 700 ends. In an exemplary embodiment; after step 755, the flowchart 700 can return to step 715, where the mobile device 140 can be configured determine if a HARQ ACK has been received from the base station 120 for the msg3 message associated with the second random access procedure. In this example, the second random access procedure can be reclassified as the "first" random access procedure and another (e.g., "second") random access procedure can be initiated at step 725.

In an exemplary embodiment, the monitoring of the msg3 transmission stage at step 730 and the monitoring for receipt of the HARQ ACK at step 735 can be performed simultaneously or substantially simultaneously. In this example, if the second random access procedure reaches the stage of msg3 transmission (YES at step 730), the flowchart 700 transitions to step 750, where the first random access procedure is aborted and the second random access procedure is continued at step 755. Similarly, if the HARQ ACK is received for the first random access procedure (YES at step 735), the flowchart transitions to step 740 where the second random access procedure is aborted and the first random access procedure is continued at step 745.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not the Summary and Abstract sections, is intended to be used to interpret the claims. The Summary and Abstract sections ma set forth one or more but not all exemplary embodiments of the present disclosure as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building Hocks have been arbitrarily defined herein for the convenience of the description. Alternate boundaries may be defined so long as the specified functions and relationships thereof are appropriately performed.

What is claimed is:

1. A communication device, comprising:
a transceiver configured to communicate with a communication network; and
processor circuitry communicatively coupled to the transceiver, the processor circuitry being configured to:
determine an upper threshold number of random access (RA) preamble transmission attempts for an RA procedure;
determine a transmission number of an RA preamble by the communication device;
determine a power ramping step value;
determine a transmission power value for transmission of the RA preamble based on the upper threshold number of RA preamble transmission attempts, the transmission number of the RA preamble, and the power ramping step value; and
generate an RA transmission and cause the transceiver to transmit the RA transmission to a base station, the RA transmission having the determined transmission power value.

2. The communication device of claim 1, wherein the processor circuitry is further configured to reduce the transmission power value by the power ramping step value for a subsequent transmission of the RA preamble.

3. The communication device of claim 2, wherein the transmission power value is at a saturation value when the transmission number of the RA preamble is one.

4. The communication device of claim 2, wherein the transmission power value is at a low threshold value when the transmission number of the RA preamble is equal to the upper threshold number of RA preamble transmission attempts.

5. The communication device of claim 2, wherein the processor circuitry is further configured to reduce the transmission power value until an RA response has been received from the base station.

6. The communication device of claim 2, wherein the processor circuitry is further configured to reduce the transmission power value until the upper threshold number of random RA preamble transmission attempts for the RA procedure equals the transmission number of the RA preamble.

7. The communication device of claim 1, wherein the upper threshold number of RA preamble transmission attempts, the transmission number of the RA preamble, and the power ramping step value are provided to the communication device from the base station.

8. The communication device of claim 1, wherein the processor circuitry is configured to determine the transmission power value based on a product of the power ramping step value and a difference of the upper threshold number of RA preamble transmission attempts and the transmission number of the RA preamble.

9. The communication device of claim 8, wherein the transmission power value is at a saturation value when the transmission number of the RA preamble is one.

10. The communication device of claim 8, wherein the processor circuitry is further configured to determine the transmission power value based on an initial transmission power value.

11. The communication device of claim 8, wherein the processor circuitry is further configured to determine the transmission power value based on a preamble format offset.

12. The communication device of claim 1, wherein the transmission power value is initially set to a saturation power, where the saturation power is a transmission power level just below that which causes saturation at the base station.

13. The communication device of claim 1, wherein the transmission power value is at a saturation value for a plurality of transmissions of RA preambles.

14. The communication device of claim 13, wherein the processor circuitry utilizes the transmission power value at the saturation value for each of the plurality of transmissions of the RA preambles associated with an emergency call.

15. A communication device, comprising:
   a transceiver configured to communicate with a communication network; and
   processor circuitry communicatively coupled to the transceiver, the processor circuitry being configured to:
      initiate a first random access (RA) procedure;
      initiate a second RA procedure after a predetermined time following the initiation of the first RA procedure so that the second RA procedure is performed concurrently with the first RA procedure;
      determine if an acknowledgment has been received for the first RA procedure; and
      abort the second RA procedure based on a determination that the acknowledgment has been received for the first RA procedure.

16. The communication device of claim 15, wherein the processor circuitry is further configured to determine if the second RA procedure has reached a msg3 transmission stage before the determination of if the acknowledgment has been received for the first RA procedure.

17. The communication device of claim 16, wherein the processor circuitry is configured to determine if the acknowledgment has been received after a determination that the second RA procedure has reached the msg3 transmission stage.

18. The communication device of claim 15, wherein the acknowledgement indicates that a base station received an msg3 transmission from the communication device.

19. In a communication device having a transceiver configured to communicate with a communication network and processor circuitry communicatively coupled to the transceiver, a method comprising:
   determining, by the processor circuitry, an upper threshold number of random access (RA) preamble transmission attempts for an RA procedure;
   determining a transmission number of an RA preamble by the communication device;
   determining a power ramping step value;
   determining a transmission power value for transmission of the RA preamble based on the upper threshold number of RA preamble transmission attempts, the transmission number of the RA preamble, and the power ramping step value; and
   generating an RA transmission and causing the transceiver to transmit the RA transmission to a base station, the RA transmission having the determined transmission power value.

20. The method of claim 19, wherein the determining the transmission power value includes determining the transmission power value based on a product of the power ramping step value and a difference of the upper threshold number of RA preamble transmission attempts and the transmission number of the RA preamble.

* * * * *